Oct. 13, 1953     E. S. COLE ET AL     2,655,271
BAG PALLET LOADER
Filed Aug. 26, 1949     2 Sheets-Sheet 1
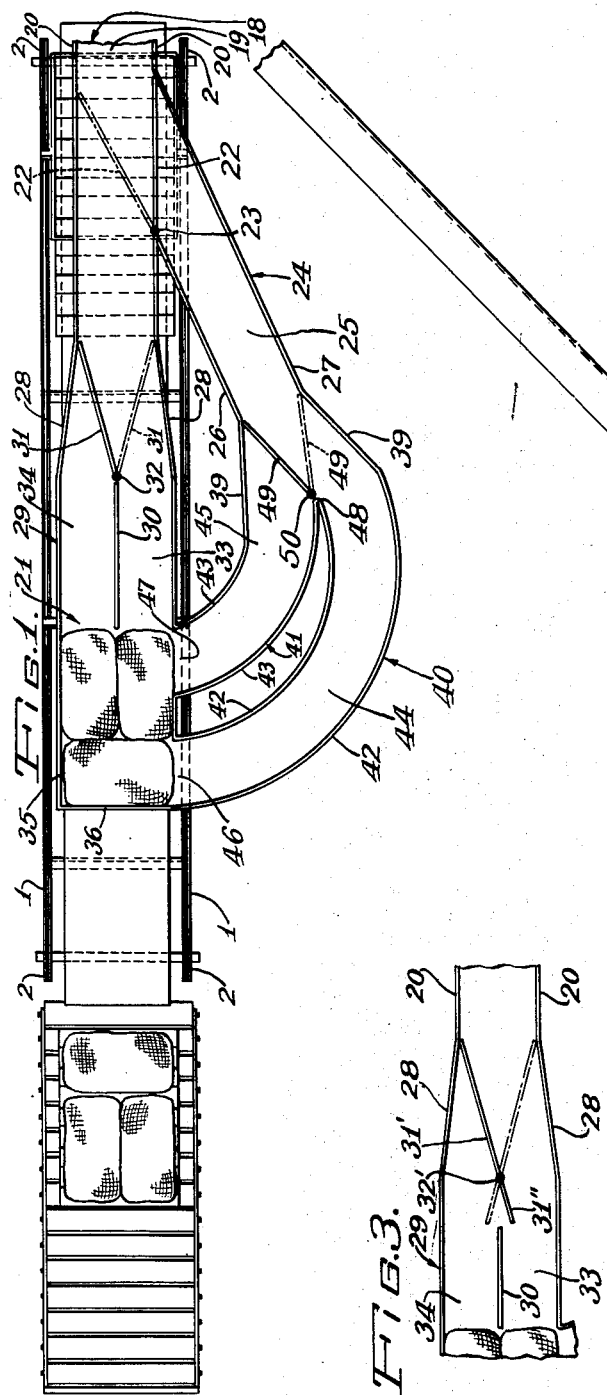
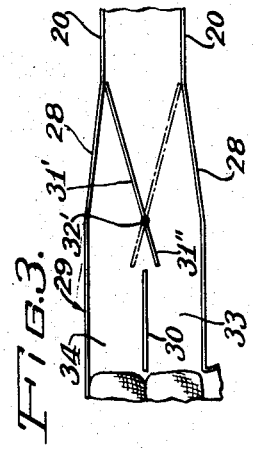
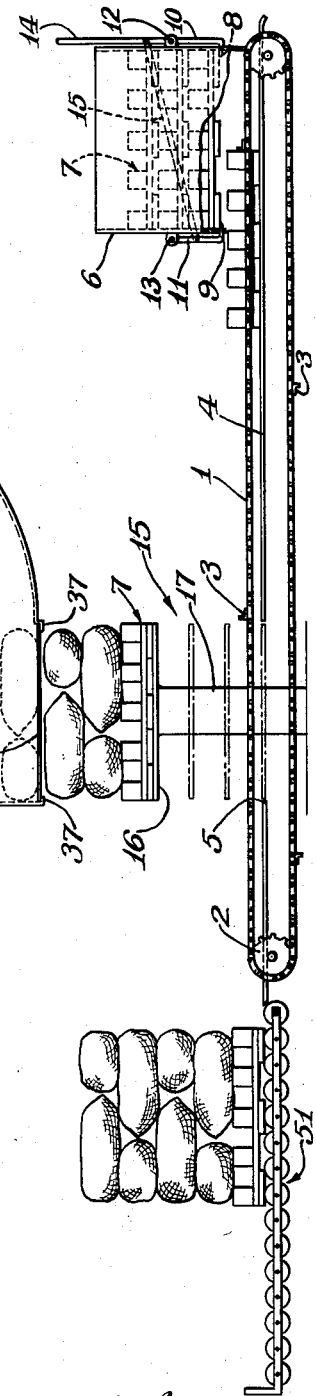
Inventors:
Earl S. Cole
Herbert D. Vanderlip
By Lee J. Gary Attorney

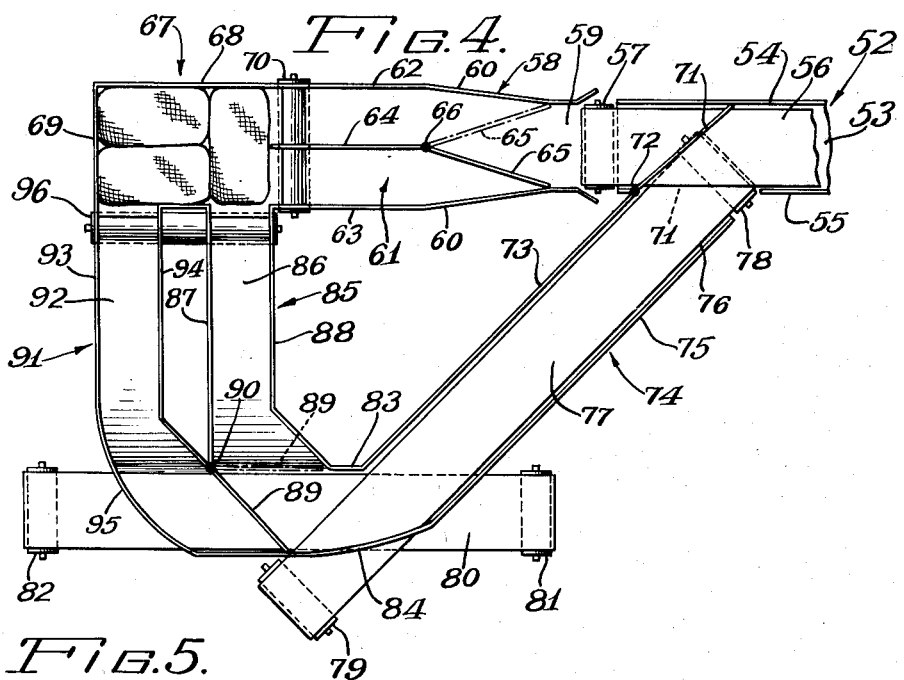
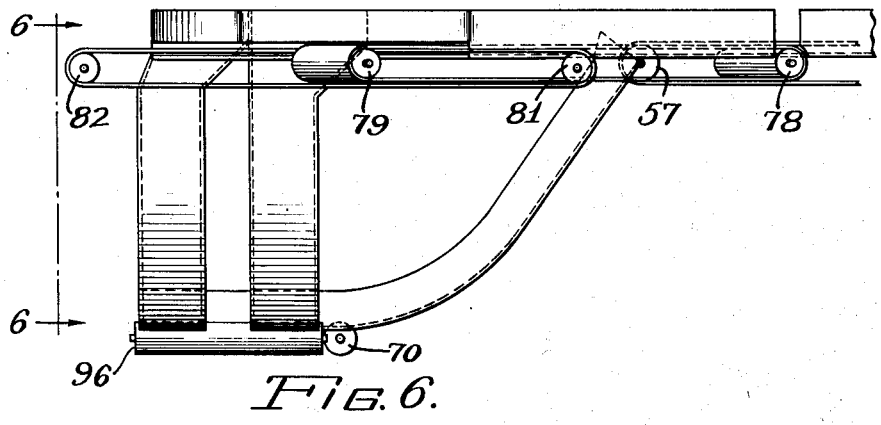
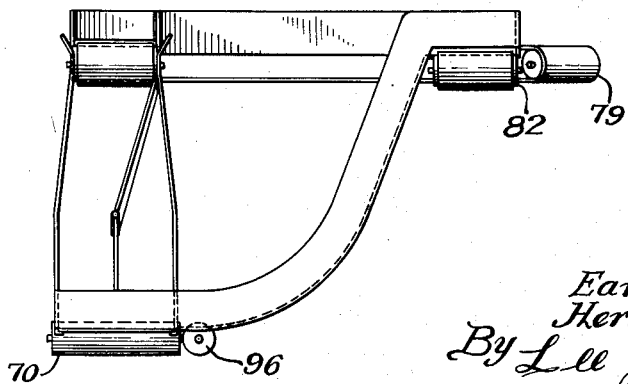
Inventors:
Earl S. Cole
Herbert D. Vanderlip
By Lee J. Gary, Attorney Patented Oct. 13, 1953

2,655,271

UNITED STATES PATENT OFFICE 2,655,271

BAG PALLET LOADER

Earl S. Cole and Herbert D. Vanderlip, Battle Creek, Mich., assignors to Kellogg Company, Battle Creek, Mich., a corporation of Delaware Application August 26, 1949, Serial No. 112,636

12 Claims. (Cl. 214—6)

This invention relates to improvements in a pallet loader and refers particularly to a pallet loader for bags, sacks, barrels, boxes or the like.

In the handling of bagged or sacked material of a dry granular or discrete type, such as, grain, feed, flour, cement or the like, after loading the bags or sacks, said bags or sacks are usually either transferred to a freight car, truck or the like or are piled in a warehouse or shipping room preparatory to being shipped. In handling such loaded bags or sacks pallets are usually employed upon which the loaded bags or sacks are piled, usually in a plurality of tiers and prior to shipping said pallets carrying the tiers of bags or sacks are usually moved from place to place by conventional lift trucks which lift and carry the pallet with the bags or sacks carried thereon. Normally, when loading the bags or sacks upon a shipping conveyance such as a freight car or truck, the lift truck lifts the tiers of bags or sacks without picking up the pallet. These operations are commonly known as "take it" or "leave it," referring particularly to whether the pallet is taken by the lift truck or not.

One of the most important tasks involved in the handling of such bags or sacks resides in the loading of the pallet and the present invention is specifically directed to this end.

Bags or sacks, in order that a predetermined number may be efficiently carried in a conveyance such as a standard freight car are normally of more or less standard sizes and consequently, pallets are of more or less standard sizes, particularly as to load-bearing area. In loading a pallet, therefore, it is customary to dispose the bags or sacks in tiers, usually with three bags or sacks to each tier. In order that the stack thus formed will be most stable, a staggered or interlocking arrangement of the bags or sacks upon the tiers is employed.

For example, two bags or sacks may be disposed upon the pallet with their longitudinal axes parallel, said two bags or sacks occupying about two-thirds of the pallet area adjacent one end of the pallet. A third bag or sack may be disposed adjacent the opposite end of the pallet, occupying the remaining third of the pallet area, with its longitudinal axis at right angles to the remaining bags or sacks. Upon the next tier the position of the three bags or sacks constituting this tier will be reversed. That is, the two bags or sacks disposed in parallel relation will be disposed above that two-thirds area of the pallet one-half of which was previously occupied by the transverse bag or sack. Above the remaining third of the pallet area a single bag or sack will be disposed transversely to the other bags or sacks comprising said tier. The remaining tiers will thus be alternated in this fashion.

One of the objects of the present invention resides in mechanism for conveniently loading a pallet in the fashion hereinbefore described wherein loaded bags or sacks are automatically disposed singly upon the pallet in the manner hereinbefore described to form a plurality of tiers of such bags or sacks.

Other objects and advantages of the present invention will be apparent from the accompanying drawings and following detailed description.

Fig. 1 is a top plan diagrammatic view of the pallet loader comprising the concepts of the present invention.

Fig. 2 is a side elevational view of the device shown in Fig. 1.

Fig. 3 is a fragmentary top plan detail view of a modified form of gate which may be employed in the pallet loader.

Fig. 4 is a top plan diagrammatic view of a modification of the pallet loader.

Fig. 5 is a side elevational view of the device shown in Fig. 4.

Fig. 6 is an end elevational view of the device shown in Fig. 4.

Referring in detail to the drawings and with specific reference to Fig. 2 thereof, 1—1 indicates a pair of spaced endlessly moving chains. Both of the chains 1 at the termination of their path of travel in each direction pass over a pair of sprocket wheels 2—2 around which said chains move in an endless fashion. Angle members 3 are secured to the chains 1 and are transversely disposed with respect to the direction of travel of said chains, the angle members being positioned upon the chains in longitudinal spaced relationship.

Between the chains 1 a platform 4 is disposed, said platform being positioned in a plane beneath the upper paths of the chains. Intermediate the length of the platform 4 an opening 5 is provided for a purpose to be hereinafter more fully described.

A hopper 6 of substantially rectangular cross-section is positioned above the chains 1 and platform 4 adjacent one end of the path of travel of said chains. The hopper 6 is adapted to carry a plurality of pallets 7 in stacked relationship. The lowermost pallet 7 is supported by means of inturned arms 8 and 9 which are carried at the lower ends of levers 10 and 11 respectively. The lever 10 is carried at its upper end upon rod 12 and the lever 11 is carried at its upper end upon rod 13. A handle 14 is positioned at one end of the hopper and is secured to rod 12. A link 15 is pivotally connected to handle 14 above the rod 12 where it makes connection with handle 14 and at its opposite end said link connects with a cross rod (not shown) which is pivotally connected to lever 11 below rod 13. The arrangement is such that by the manipulation of the handle 14 the inturned arms 8 and 9 are simultaneously retracted or inserted beneath the lowermost pallet 7 contained in the hopper 6.

When the handle 14 is manipulated to retract the arms 8 and 9 the lowermost pallet 7 drops downwardly to the platform 4. The remaining pallets in the hopper 6 are retained therein and prevented from dropping by the supporting arms 8 and 9 which can be moved inwardly immediately after dropping the lowermost pallet. The chains 1 are then set into motion and an angle member 3 engages the rear end of the pallet 7 which rests upon the platform 4. The pallet is thus moved forwardly while being supported upon the platform 4.

An elevator 15 is positioned adjacent the opening 5 in the platform 4, said elevator having a platform 16 which is substantially the same in area dimensions as the opening 5. Under normal conditions the elevator 15 is so positioned that the elevator platform 16 will be in plane parallel relationship with the fixed platform 4. The elevator 15 may conveniently take the form of a hydraulic lift, in which case the platform 16 may be positioned upon the upper end of a piston rod 17 which may be secured to a hydraulic piston (not shown) which may operate in a hydraulic cylinder (not shown) positioned beneath the conveyor.

During forward movement of the pallet 7 upon platform 4, said pallet is eventually moved to the upper surface of the elevator platform 16 at which point the movement of the chains 1 is stopped.

A main chute 18 may be positioned above the hopper 6. The chute 18 comprises essentially a bottom portion 19 with upwardly extending side walls 20. As will be hereinafter more fully described the chute 18 is adapted to provide a surface upon which loaded bags or sacks 21 may be delivered to the pallet loader. The bags or sacks after being filled with the discrete or granular material are placed upon the bottom 19 of the chute and are moved therealong to a position wherein they can be properly directed in piled position upon a pallet. The chute 18 is inclined so that a loaded bag or sack will tend to move over the surface 19 by means of gravity.

One of the side walls 20 of the chute 18 is movable, said movable portion being pivoted at 23. The member 22 acts as a switch or gate whereby the loaded sack in moving downwardly along the inclined surface 19 may be directed directly downwardly along the main chute 18 or may be diverted laterally along an auxiliary chute 24. The chute 24 comprises a bottom 25 and side walls 26 and 27. The side wall 26 of the auxiliary chute 24 joins with one wall of the main chute 18 at the pivotal connection 23 and the side wall 27 joins with the same wall of the chute 18 at a point spaced from the pivot 23. In effect, when the movable member 22 is moved to the dotted position (Fig. 1) the member 22 comprises a continuation of the side wall 26 of the auxiliary chute 24. When said movable member is in the position shown in full lines (Fig. 1) the movable member 22 comprises, in effect, a continuation of one of the walls 20 of the main chute 18. The auxiliary chute 24 is inclined at substantially the same angle as the main chute 18. The arrangement is such that when a loaded bag or sack 21 moves downwardly along the main chute 18 it may be diverted to the auxiliary chute 24 if the movable member 22 has been swung to the position shown in dotted lines. If the gate 22 is positioned as shown in full lines the loaded bag or sack moves directly downwardly along the main chute 18.

Intermediate the length of the main chute 18 the side walls thereof diverge as shown best at 28 in Fig. 1. In addition, the bottom 19 is widened to provide a trough conveyor 29 of greater width than the main chute 18. An upwardly extending wall 30 is positioned intermediate the width of the trough conveyor 29, said wall being disposed parallel to the length of said conveyor. At the forward end of the center wall 30 a movable member or gate 31 is positioned, said gate being pivoted adjacent the forward end of the wall 30, as at 32.

The operation is such that when a loaded bag or sack moves downwardly along the main chute 18 it can be diverted depending upon the position of the gate 31 to one side or the other of the center wall 30. For instance, if the gate 31 is disposed in the position shown in full lines in Fig. 1 the loaded bag or sack may be diverted into the trough conveyor 33. If the gate 31 is disposed in the position shown in broken lines the bag or sack may be diverted to the inner trough conveyor 34, the trough conveyors 33 and 34 being on opposite sides of the center wall 30.

At the lower portion of the trough conveyor 29, said trough conveyor is disposed with its plane substantially horizontal. In effect the lower portion of the trough conveyor comprises a box having a side wall 35 and an end wall 36, the side wall 35 comprising essentially a continuation of one side wall of the trough conveyor 29. At the horizontal portion of the trough conveyor 29, the bottom portion thereof is left open. Inwardly extending flanges 37 are provided at spaced points transversely to the length of the trough conveyor 29, said flanges being adapted to support a slidable plate 38 which when in supported position by the flanges 37 comprises, in effect, a continuation of the bottom of the trough conveyor 29.

Intermediate the length of the auxiliary chute 24, said chute widens as shown best at 39 in Fig. 1. At the widened portion of the auxiliary chute 24 two branch trough conveyors 40 and 41 connect with the auxiliary chute 24. Each of the trough conveyors 40 and 41 is of a construction essentially the same as the main chute 18 and auxiliary chute 24, that is, it has side walls 42 and 43 respectively comprising the side walls of the branch conveyors 40 and 41 and bottoms 44 and 45 respectively.

The branch conveyors 40 and 41 are curved and open into a side portion of the box hereinbefore described, the branch conveyor 40 opening into the forward end of the box as indicated at 46 in Fig. 1 and the branch conveyor 41 entering into the rear portion of the box as shown best at 47 in Fig. 1. The inner walls 42 and 43 of the branch conveyors 40 and 41 converge and join at a point 48, adjacent which point a movable gate 49 is pivoted as at 50.

The arrangement is such that a loaded bag or sack which may be diverted downwardly along the auxiliary chute 24, may again be diverted along either branch conveyor 40 or 41 depending upon the position of the gate 49. For example, if the gate 49 is positioned as shown in full lines in Fig. 1 the bag or sack will be directed into the conveyor 40. If the gate 49 is in the position shown in broken lines in Fig. 1 the bag or sack will be directed into conveyor 41.

When the sacks or bags are positioned in the main conveyor 18 they are disposed with their longitudinal axes parallel to the length of the conveyor. Consequently, as said sacks move downwardly through the main conveyor and into the branch conveyors 33 or 34 they will move lengthwise through said conveyors or if said sacks are diverted downwardly through the auxiliary conveyor 24 and into the branch conveyors 40 or 41 they will move lengthwise through said conveyors. By virtue of the fact that the branch conveyors 40 and 41 are curved the sacks delivered through either of these conveyors will be disposed with their axes at right angles to the axes of the sacks delivered through the branch conveyors 33 and 34.

In operation, after the pallet 7 has been moved to the upper surface of the movable platform 16, that is the elevator platform, the elevator is raised until the upper portion of the pallet carried thereby is positioned immediately beneath the slidable plate 38 which is then disposed at the lower portion of the box. The pallet is then ready to be loaded. To load the pallet sacks or bags are moved in seriatim downwardly through the various trough conveyors and by the proper manipulation of the gates 22, 31 and 49 the bags or sacks 21 may be disposed in the desired manner upon the pallet.

For example, one order of disposition of the bags or sacks upon the pallet may be as follows: The first bag or sack moving downwardly through the main trough conveyor 18 may be diverted down the auxiliary conveyor 24. To cause such diversion the gate 22 will be positioned in its dotted line position as shown in Fig. 1. The gate 49 may be positioned in its full line position in which case the first bag or sack will be diverted downwardly through the branch conveyor 40 and will enter the box with its longitudinal axis transverse to the length of the box and said sack will be disposed at the forward end of the box, the sack being supported by the movable plate 38. When the next loaded bag or sack which moves downwardly through the main conveyor 18 the gate 22 will be disposed in its full line position. With gate 31 disposed in its full line position said bag or sack will be diverted through branch conveyor 33. With gate 22 disposed in the same position gate 31 may be disposed in its dotted line position and the next sack or bag will move through branch conveyor 34. In this manner the three loaded bags or sacks 21 will be disposed in the box in the position indicated in the drawings. The movable bottom 38 may then be withdrawn and the three bags or sacks supported by said movable bottom will position themselves upon the upper surface of the pallet 7 which, as has been hereinbefore described, will be immediately beneath the movable bottom 38.

The elevator 15 will then be lowered a predetermined degree substantially equal to the thickness of the sacks 21 positioned upon the pallet. The movable bottom 38 of the box will then be reinserted in supported position by the flanges 37, said bottom being then positioned above the three bags or sacks carried upon the pallet.

The operation will then be repeated with the appropriate setting of the gates 22, 31 and 49 so as to position two sacks with their longitudinal axes parallel at the forward end of the box and the third sack with its longitudinal axis transverse to the length of the box at the rear portion of the box, the latter sack being diverted through the branch conveyor 41. The movable bottom 38 may then be slid outwardly and the three sacks will be disposed in a reverse or interlocking relationship to the three sacks then carried upon the pallet. The operation may then be repeated with the gate so manipulated as to cause the bags or sacks to assume the desired position upon the bottom 38 and in each case after three sacks have been properly disposed upon said bottom said bottom is removed to position the sacks upon the tier of sacks previously positioned upon the pallet. After the positioning of each three sacks upon the pallet the elevator 15 is lowered the desired degree until the surface of the platform 16 of the elevator is in plane-parallel relationship with the platform 4.

At this phase of the operation the conveyor chains are again moved forwardly and the loaded pallet 7 is carried forwardly along the stationary portion of the platform 4 and is eventually transferred from said stationary platform to the roller conveyor unit 51 from which latter the loaded pallet may be picked up by a conventional lift truck operating in either the "take it" or "leave it" manner. Simultaneously with the movement of the loaded pallet to the conveyor 51 a pallet will be removed from the hopper 6 by the proper manipulation of the handle 14 and the new pallet will be positioned upon the upper surface of the elevator platform 16 wherein it is in a position to be raised adjacent the lower surface of the movable plate 38.

Referring particularly to Fig. 3 a modified form of gate mechanism is illustrated. In this figure similar reference numerals will be employed to indicate identical elements of the apparatus hereinbefore described. The portion illustrated refers particularly to the widened portion of the main conveyor comprising the entrance to the branch conveyors 33 and 34. In this form of the invention a gate 31' is employed, said gate being pivoted intermediate its length as at 32', the pivot point being spaced from the end of the center wall 30 so as to provide an end portion 31'' on the opposite side of the pivot point 32'.

The arrangement is such that when the gate 31' is positioned in the appropriate position to divert a loaded bag or sack through the branch conveyor 33 the passage of the bag or sack past the end 31'' will act to swing the gate 31'' to a position whereby the next bag or sack will automatically be diverted through the branch conveyor 34. In this manner in disposing the loaded bags or sacks in longitudinal position upon the bottom plate 38 the positioning of the bags or sacks upon the bottom 38 will be automatically prearranged, that is, alternate bags or sacks will be diverted through the branch conveyors 33 and 34.

The gate 31' may be substituted for gate 31 and/or gate 49, for in each case said gates are successively swung to alternate positions to properly dispose the loaded bags or sacks in the box.

Referring particularly to Figs. 4, 5 and 6, a modification of the invention is shown. In this form of the invention a material portion of the vertical space necessary for complete gravity operation, as contemplated in the form shown in Figs. 1 and 2, is conserved.

A feeding conveyor trough 52 is contemplated having a bottom 53 and opposite side walls 54 and 55 connected to said bottom. The conveyor trough 52 is disposed substantially horizontally and a conveyor belt 56, at its upper pass, moves immediately above the conveyor bottom 53. The conveyor belt 56 is trained around conveyor pulley 57 and at the opposite end of the pass the belt is trained around a similar pulley (not shown). The conveyor 52 by means of the moving belt 56 may function to convey loaded bags or sacks from the loading room of the establishment and bring them to the mechanism, to be hereinafter more fully described, which constitutes the pallet loader.

At the forward extremity of travel of the conveyor belt 56, that is, where said belt passes around the pulley 57, an inclined trough 58 is positioned, said trough having a receiving mouth 59 wherein loaded bags or sacks from the conveyor belt 56 are charged to the conveyor 58. Beyond the mouth 59 the inclined conveyor 58 widens as shown best at 60 in Fig. 4. The conveyor trough 58 comprises a bottom 61 and side walls 62 and 63, the side wall 62, in effect, comprising a continuation of side wall 54 and the side wall 63 comprising, in effect, a continuation of the side wall 55. At the widest portion of the inclined conveyor trough 58 a center wall 64 is positioned, said wall being disposed parallel to the walls 62 and 63. At one extremity of the center wall 64, adjacent the tapered portion of the trough conveyor a gate 65 is pivotally mounted, as at 66, the gate 65 being positionable to divert loaded sacks or bags to that portion of the conveyor confined between the walls 62 and 64, in which case the gate will be disposed as shown in full lines in Fig. 4, or the gate may be disposed as shown in dotted lines in said figure whereby the bags or sacks will be diverted into that portion of the conveyor trough between walls 63 and 64.

The conveyor trough 58 is inclined downwardly from the discharge end of the conveyor belt 56 and said inclined conveyor terminates in a horizontal box-like portion 67. The box-like portion 67 has a side wall 68 comprising a continuation of the wall 62 and an end wall 69. The arrangement is such that a sack delivered to the box 67 from between walls 62 and 64 will be disposed in the box 67 adjacent its extremity, the sack being disposed therein with its longitudinal axis positioned parallel to the longitudinal axis of the box and a sack delivered to the box from between the walls 63 and 64 will be positioned in the box adjacent and parallel to the first mentioned sack.

In order to conserve vertical space it may be necessary in delivering the sacks or bags to the pallet loader by the action of gravity alone the elevation of the conveyor belt 56 above the box will not be as great as it is in the case of the form of the invention shown in Figs. 1 and 2. However, in order that the sacks delivered from the conveyor trough 58 may be properly positioned within the box 67 a roll 70 is positioned adjacent the entrance to the box with its longitudinal axis disposed transverse to the length of the trough conveyor 58. The upper surface of the roll 70 will protrude above the bottom 61 of the trough 58 so that when bags or sacks are delivered down through either branch of the trough 58 the inclination of said trough need only be necessary to position the sacks above the protruding surface of the roll 70. The roll 70 is preferably separately driven and is driven at a speed sufficient to urge or throw the sacks forwardly toward the end wall 69. The surface of the roll 70 may be constructed of rubber or other relatively high friction material whereby to facilitate the forward moving or throwing of the sacks. Comparing the present structure to that previously described in conjunction with Figs. 1 and 2, the roll 70 will impart to the sacks which pass thereover a speed which would be equivalent to that gained by the sacks in passing down the conveyor trough 29. Consequently instead of relying upon a greater elevation of the feeding end of the trough above its discharge end, a lesser elevation may be employed and the movement of the roll 70 may function to impart the necessary momentum or speed to the sacks in order to properly position them in the box 67.

A portion of the side wall 55 of the conveyor trough 52 is movable to form a gate 71 which may be pivotally connected to the side wall 55 as at 72. The gate 71 may be disposed transversely across the conveyor belt 56 as shown best in full lines in Fig. 4 in which case the gate 71, in effect, comprises a continuation of a side wall 73 of a horizontally disposed lateral conveyor trough 74. When the gate 71 is disposed in its dotted line position in Fig. 4 the gate comprises essentially a continuation of the side wall 55. The horizontally disposed conveyor trough 74 comprises in addition to the side wall 73 an opposite side wall 75 and a supporting bottom 76. A conveyor belt 77 at its upper pass is adapted to move immediately above and be supported by the bottom 76 of the conveyor trough 74. The belt 77 is trained around pulley 78 and pulley 79, the pulley 78 being positioned between the upper and lower passes of the conveyor belt 56.

The arrangement is such that when gate 71 is swung into alignment with wall 73 a bag or sack carried upon conveyor belt 56 upon contacting the gate 71 will be diverted from said conveyor belt onto the upper surface of the transversely moving conveyor belt 77. As will be hereinafter more fully described the bags or sacks thus diverted will be directed to a transverse position in the box 67, that is, they will be disposed transversely with respect to those bags or sacks which are charged directly to the box from the conveyor trough 58.

A third conveyor belt 80 is trained around spaced conveyor pulleys 81 and 82, the belt 80 moving in a direction substantially parallel to the direction of movement of the belt 56. The belt 80 passes transversely across the belt 77 adjacent pulley 79 and the upper pass of the belt 80 is disposed immediately beneath and parallel to the upper pass of the conveyor belt 77. Wall 73 of the conveyor trough 74 terminates adjacent a lateral edge of the belt 80 and the opposite wall 75 terminates adjacent the opposite lateral side of said belt. Beyond the points of termination of said walls 73 and 75 said walls are respectively connected to walls 83 and 84. The wall 83 is disposed substantially parallel to one lateral side of the belt 80 and the wall 84 is slightly curved, a portion thereof extending parallel to the opposite lateral edge of the belt 80.

The arrangement is such that bags or sacks which are carried upon the conveyor belt 77 engage the curved wall 84 and are thus diverted onto the upper surface of the conveyor belt 80.

An inclined branch conveyor trough 85 having bottom 86 and upwardly extending side walls 87 and 88 opens into one end of box 67. The opposite end of the inclined trough 85 terminates adjacent one lateral edge of the conveyor belt 80. At this end of the conveyor trough 85 a gate 89 is pivotally mounted as at 90. The gate 89 can be swung to the position shown in full lines in Fig. 4 whereby loaded sacks which have been transferred from the conveyor belt 77 to the conveyor belt 80 are diverted to the inclined trough 85 and eventually are charged into one end of the box 67.

A second inclined branch conveyor 91 comprising bottom 92 and upwardly extending side walls 93 and 94 is disposed parallel to and spaced from the inclined conveyor trough 85. Wall 94 of conveyor trough 91 joins wall 87 of the conveyor trough 85 at the pivot point 90 of gate 89 and the opposite wall 93, being curved at 95, connects with the end of wall 84. The curved portion 95 of wall 93 extends over the upper pass of the conveyor belt 80 in such a manner that when gate 89 is swung to its dotted line position a sack carried upon the conveyor belt 80 contacts the curved wall 95 and is diverted downwardly through the inclined conveyor trough 91. The lower end of said trough connects with an end of the box 67 whereby a bag or sack delivered through the branch conveyor trough 91 will be delivered into the box 67 in a position adjacent an end of the box and with its axis transverse to the box.

A driven roll 96 is disposed adjacent the side of the box 67 opposite to the wall 68, the axis of the roll 96 being disposed parallel to said opposite wall. The upper surface of roll 96 protrudes above the bottoms 86 and 92 of the inclined trough conveyors 85 and 91 respectively. The arrangement is such that sacks delivered through branch conveyors 85 or 91 are positioned at the lowermost portion of their travel upon the moving surface of roll 96 which, similar to roll 70, is driven at a peripheral speed sufficient to accelerate or throw the bag or sack into the box 67, specifically with the ends of the sacks contacting the wall 68.

In the operation of this form of the invention it can readily be seen that the sacks may be disposed in the box in the manner hereinbefore described, that is with two sacks disposed with their axes parallel to the longitudinal axis of the box and adjacent one end of the box and the third sack disposed transversely with respect to the remaining two sacks. As has been hereinbefore described in conjunction with Figs. 1 and 2 the box 67 may be provided with a movable bottom similar to the bottom 38 whereby each tier of sacks deposited in the box 67 may be delivered to the pallet 7 being loaded, the pallet being carried by an elevator similar to that hereinbefore described.

The propeller loading of the box 67, of course, involves the proper manipulation of the gates 71, 65 and 89, the gate 71 serving to direct sacks either parallel to the box or at right angles to the box. The gate 65 disposes the sacks in succession adjacent one side or the other side of the box 67 and the gate 89 functions to dispose a sack adjacent one end or the opposite end of the box 67.

If desired, the gates 65 and 89 may be of a construction similar to that described in conjunction with Fig. 3 since said gates are alternately operated in one direction and then in the other. The conveyor belts 56, 77 and 80 are preferably driven at the same translatory speed and may be driven from the same source of power (not shown). Both rolls 70 and 96 are driven from a suitable source of power (not shown) and may if desired be geared together, the only requisite being that the peripheral speed of said rolls should be such that the sacks are vigorously projected into the box 67.

We claim as our invention:

1. A bag pallet loader which comprises in combination a substantially rectangular receptacle for receiving a plurality of loaded bags, said receptacle having adjacent sides at substantially right angles to each other, a removable bottom for said receptacle for supporting said bags, means for guiding a plurality of loaded bags to predetermined coplanar positions within said receptacle and supported upon the bottom thereof, said means connecting into said adjacent sides of the receptacle, means for supporting a pallet beneath said receptacle, said bags being dischargeable from said receptacle to the pallet carried therebeneath by removal of said receptacle bottom.

2. A bag pallet loader which comprises in combination a substantially rectangular receptacle for receiving a plurality of loaded bags, a removable bottom for said receptacle for supporting said bags, a pair of chutes for successively guiding a plurality of loaded bags in seriatim to predetermined coplanar positions within said receptacle and supported upon the bottom thereof, said chutes entering adjacent sides of said receptacle, means for supporting a pallet beneath said receptacle, said bags being dischargeable from said receptacle to the pallet carried therebeneath by removal of said receptacle bottom.

3. A bag pallet loader which comprises in combination a receptacle for receiving a plurality of loaded bags, said receptacle having a pair of angularly disposed adjacent sides, a slidably removable bottom for said receptacle for supporting said bags, means for successively guiding a plurality of loaded bags in seriatim to predetermined coplanar positions within said receptacle and supported upon the bottom thereof, said means connecting into said pair of angularly disposed adjacent sides, means for supporting a pallet beneath said receptacle, said bags being dischargeable from said receptacle to supported position by said pallet carried therebeneath by the slidable removal of said receptacle bottom.

4. A bag pallet loader which comprises in combination a receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes connecting into said receptacle at right angles to each other whereby to dispose bags entering said receptacle from said chutes at right angles to each other within said receptacle, means for supporting a pallet beneath said receptacle, said bags being dischargeable from said receptacle to the pallet carried therebeneath by removal of said receptacle bottom.

5. A bag pallet loader which comprises in combination a substantially rectangular receptacle for receiving a plurality of loaded bags, means for guiding a plurality of loaded bags to predetermined coplanar positions within said receptacle to form a tier of bags, said means comprising a pair of chutes connecting into adjacent sides of said receptacle, removable means for supporting a pallet beneath said receptacle, whereby successive tiers of bags carried upon said removable means in said receptacle are discharged by gravity to superimposed position upon said pallet.

6. A bag pallet loader which comprises in combination a rectangular receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes, each chute comprising a pair of trough conveyors disposed laterally adjacent each other, means connecting one pair of trough conveyors into one side of said receptacle, and means connecting the other pair of trough conveyors into an adjacent side of said receptacle, whereby loaded bags delivered through said trough conveyors are discharged into said receptacle adjacent predetermined sides thereof and at predetermined positions with respect to each other, means for supporting a pallet beneath said receptacle, said bags being dischargeable from said receptacle to the pallet carried therebeneath by removal of said receptacle bottom.

7. A bag pallet loader which comprises in combination a rectangular receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes, each chute comprising a pair of trough conveyors disposed laterally adjacent each other, means connecting one pair of trough conveyors into one side of said receptacle, and means connecting the other pair of trough conveyors into an adjacent side of said receptacle, means for controllably guiding loaded bags into predetermined trough conveyors whereby loaded bags delivered through said trough conveyors are discharged into said receptacle adjacent predetermined sides thereof and at predetermined positions with respect to each other, means for supporting a pallet beneath said receptacle, said bags being dischargeable from said receptacle to the pallet carried therebeneath by removal of said receptacle bottom.

8. A bag pallet loader which comprises in combination a rectangular receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of inclined chutes, each chute comprising a pair of trough conveyors disposed laterally adjacent each other, means connecting one pair of trough conveyors into one side of said receptacle at the lower portions of the incline, and means connecting the other pair of trough conveyors into an adjacent side of said receptacle at the lower portion of the incline whereby loaded bags delivered through said trough conveyors are discharged by gravity into said receptacle adjacent predetermined sides thereof and at predetermined positions with respect to each other, means for supporting a pallet beneath said receptacle, said bags being dischargeable from said receptacle by gravity to the pallet carried therebeneath by removal of said receptacle bottom.

9. A bag pallet loader which comprises in combination a rectangular receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes, gate means for guiding said bags into a predetermined chute, each chute comprising a pair of trough conveyors disposed laterally adjacent each other, gate means for guiding bags into predetermined trough conveyors, means connecting one pair of trough conveyors into one side of said receptacle, and means connecting the other pair of trough conveyors into an adjacent side of said receptacle, whereby loaded bags delivered through said trough conveyors are discharged into said receptacle adjacent predetermined sides thereof and at predetermined positions with respect to each other, means for supporting a pallet beneath said receptacle, said bags being dischargeable from said receptacle to the pallet carried therebeneath by removal of said receptacle bottom.

10. A bag pallet loader which comprises in combination a rectangular receptacle for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes, each chute comprising a pair of trough conveyors disposed laterally adjacent each other, means connecting one pair of trough conveyors adjacent each other into an end of said receptacle, and means connecting the other pair of trough conveyors into a side of said receptacle in spaced relationship with respect to each other, whereby loaded bags delivered through said trough conveyors are discharged into said receptacle adjacent predetermined sides and ends thereof and at predetermined positions with respect to each other, means for supporting a pallet beneath said receptacle, said bags being dischargeable from said receptacle to the pallet carried therebeneath by removal of said receptacle bottom.

11. A bag pallet loader which comprises in combination a receptacle for receiving a plurality of loaded bags, a removable bottom for said receptacle for supporting said bags, means for successively guiding a plurality of loaded bags in seriatim to predetermined portions of said receptacle, driven means urging said bags so guided into coplanar positions within said receptacle and supported upon the bottom thereof, means for supporting a pallet beneath said receptacle, said bags being dischargeable from said receptacle to the pallet carried therebeneath by removal of said receptacle bottom.

12. A bag pallet loader which comprises in combination a rectangular receptacle having defining walls for receiving a plurality of loaded bags, a removable bottom for said receptacle for supporting said bags, means for successively guiding a plurality of loaded bags in seriatim to predetermined coplanar positions within said receptacle and supported upon the bottom thereof, said means comprising a pair of chutes, each chute comprising a pair of trough conveyors disposed laterally adjacent each other, means connecting one pair of trough conveyors into an end wall of said receptacle, and means connecting the other pair of trough conveyors into an adjacent side wall of said receptacle, and driven means adjacent the connection of each pair of trough conveyors and said receptacle for urging bags in said conveyors into said receptacle adjacent predetermined defining walls thereof and at predetermined positions with respect to each other, means for supporting a pallet beneath said receptacle, said bags being dischargeable from said receptacle to the pallet carried therebeneath by removal of said receptacle bottom.

EARL S. COLE.
HERBERT D. VANDERLIP.

References Cited in the file of this patent

UNITED STATES PATENTS

| Number | Name | Date |
| --- | --- | --- |
| 799,941 | Rivers | Sept. 19, 1905 |
| 1,208,802 | Lienau | Dec. 19, 1916 |
| 1,208,803 | Lienau et al. | Dec. 19, 1916 |
| 1,247,722 | Rogers et al. | Nov. 27, 1917 |
| 1,661,969 | Semashko | Mar. 6, 1928 |
| 2,228,887 | Peterson | Jan. 14, 1941 |
| 2,396,090 | Curtis | Mar. 5, 1946 |